(12) United States Patent
Kadoch et al.

(10) Patent No.: US 12,548,437 B2
(45) Date of Patent: Feb. 10, 2026

(54) SYSTEMS AND METHODS FOR POLICY CENTRIC DATA RETENTION IN TRAFFIC MONITORING

(71) Applicant: Rekor Systems, Inc., Columbia, MD (US)

(72) Inventors: Christopher Allen Kadoch, Leesburg, VA (US); Jason Skipper, Sanford, FL (US); Matthew Anthony Hill, Sanford, NC (US)

(73) Assignee: Rekor Systems, Inc., Columbia, MD (US)

( * ) Notice: Subject to any disclaimer, the term of this patent is extended or adjusted under 35 U.S.C. 154(b) by 0 days.

(21) Appl. No.: 17/489,861

(22) Filed: Sep. 30, 2021

(65) Prior Publication Data
US 2022/0101724 A1 Mar. 31, 2022

Related U.S. Application Data

(60) Provisional application No. 63/085,783, filed on Sep. 30, 2020.

(51) Int. Cl.
*G08G 1/017* (2006.01)
*G06V 20/52* (2022.01)
(Continued)

(52) U.S. Cl.
CPC ............ *G08G 1/0175* (2013.01); *G06V 20/52* (2022.01); *G08G 1/04* (2013.01); *G08G 1/048* (2013.01);
(Continued)

(58) Field of Classification Search
None
See application file for complete search history.

(56) References Cited

U.S. PATENT DOCUMENTS

| 7,068,185 B2 | 6/2006 | Kavner | |
|---|---|---|---|
| 11,416,542 B1 * | 8/2022 | Campbell | H04N 7/188 |

(Continued)

FOREIGN PATENT DOCUMENTS

| CN | 110275983 A | 9/2019 |
|---|---|---|
| CN | 108492580 B | 3/2020 |

(Continued)

OTHER PUBLICATIONS

PCT/US21/71660, International Search Report (PCT/ISA/220 and PCT/ISA/210) dated Dec. 29, 2021, enclosing Written Opinion of the International Searching Authority (PCT/ISA/237) (Eight (8) pages).

(Continued)

*Primary Examiner* — James M Anderson, II
(74) *Attorney, Agent, or Firm* — Crowell & Moring LLP

(57) ABSTRACT

A traffic monitoring system includes a roadside traffic sensor unit and an off-site device remote from the traffic sensor unit. The roadside traffic sensor unit includes an imaging device that captures images of vehicles within a field-of-view of the imaging device, an image processing unit that generates a recognition record from the captured images of a vehicle, and a transceiver that transmits the recognition record. The off-site device includes a transceiver that receives the recognition record and a hot list identifying one or more vehicles-of-interest, a memory that stores the received recognition record for up to a retention period, and a processor that sets the retention period based on a comparison of the recognition record to the hot list identified vehicles-of-interest. The retention period can be variably set according to the severity of any "hits" to the hot list.

20 Claims, 2 Drawing Sheets

(51) Int. Cl.
  *G08G 1/04* (2006.01)
  *G08G 1/048* (2006.01)
  *G08G 1/056* (2006.01)
  *G06V 20/62* (2022.01)

(52) U.S. Cl.
  CPC .......... *G08G 1/056* (2013.01); *G06V 20/625* (2022.01); *G06V 2201/08* (2022.01)

(56) References Cited

U.S. PATENT DOCUMENTS

| | | | |
|---|---|---|---|
| 2003/0080878 A1* | 5/2003 | Kirmuss | G11B 27/36 348/E7.086 |
| 2004/0252193 A1 | 12/2004 | Higgins | |
| 2013/0311641 A1 | 11/2013 | Chow et al. | |
| 2018/0268238 A1 | 9/2018 | Khan et al. | |
| 2022/0172586 A1* | 6/2022 | San Pedro | G08B 13/19671 |

FOREIGN PATENT DOCUMENTS

| | | | |
|---|---|---|---|
| KR | 10-1127511 B1 | 3/2012 | |
| WO | WO-2017123665 A1 * | 7/2017 | ......... G06K 9/00791 |
| WO | WO 2018/215914 A1 | 11/2018 | |

OTHER PUBLICATIONS

PCT/US2021/071660, International Preliminary Report on Patentability (PCT/IB/326 and PCT/IB/373) dated Apr. 13, 2023, enclosing Written Opinion of the International Searching Authority (PCT/ISA/237) (Seven (7) pages).

English-language Supplementary European Search Report issued in European Application No. 21876709.3-1207 dated Jul. 9, 2024 (10 pages).

* cited by examiner

SYSTEMS AND METHODS FOR POLICY CENTRIC DATA RETENTION IN TRAFFIC MONITORING

CROSS-REFERENCE TO RELATED APPLICATIONS

This application claims the benefit of U.S. Provisional Application No. 63/085,783, filed Sep. 30, 2020, the disclosures of which are expressly incorporated by reference herein.

BACKGROUND

The present invention relates to traffic monitoring systems and methods, and more particularly to such systems and methods that enhance the ability to comply with the evolving concerns for privacy within the community.

Automated license plate readers, have been used by law enforcement to monitor roadways for vehicles of interest to law enforcement—e.g., vehicles owned by persons suspected of committing crimes. Imaging devices capture images of license plates, and image recognition software produces a read-record that identifies the license plate number for comparison to a hot list of vehicles-of-interest. The vehicles-of-interest may be vehicles connected to individuals on criminal wanted lists, terrorist watch lists, scofflaw lists, outstanding warrant lists, etc., or may be identified as stolen, as registration-expired, etc. This comparison of read-records with hot lists generally occurs at a central system server that collects the read-records.

The central server system generally retains the read-records for a period of time that allows for law-enforcement to retrieve the read-records inclusive of any hits (i.e., read-records that identify vehicles on a hot list). That retention period generally applies to all of the read-records.

Most of the read-records, however, are not hits. The retention of these non-hit read-records raises personal privacy concerns in local communities. Moreover, some communities may have policies against enforcing certain types of hot lists, e.g., immigration agency hot lists.

It is therefore desirable to provide traffic monitoring systems and methods that permit the customized setting and adjustment of the retention periods in accordance with the evidence value to the community of hits on individual hot lists.

BRIEF SUMMARY OF THE INVENTION

Systems and methods are disclosed for reducing the operational load on the communications infrastructure of traffic monitoring systems. In at least one embodiment, a traffic sensor unit can include an imaging device that captures images of vehicles within a field-of-view of the imaging device. The traffic sensor unit can also include an image processing unit that generates a recognition record from the captured images of a vehicle. The traffic sensor still further can include a transceiver that transmits the recognition record to an off-site device remote from the traffic sensor unit. The off-site device can include a transceiver that receives the recognition record transmitted by the traffic sensor unit and a hot list identifying one or more vehicles-of-interest. The off-site device can also include a memory that stores the received recognition record for up to a retention period, and a processor that sets the retention period based on a comparison of the recognition record to the hot list identified vehicles-of-interest. The customized setting and adjustment of the retention periods in accordance with the evidence value to the community of hits on individual hot lists can therefore be achieved.

Other objects, advantages and novel features of the present invention will become apparent from the following detailed description of one or more preferred embodiments when considered in conjunction with the accompanying drawings. It should be recognized that the one or more examples in the disclosure are non-limiting examples and that the present invention is intended to encompass variations and equivalents of these examples.

BRIEF DESCRIPTION OF THE DRAWINGS

The features, objects, and advantages of the present invention will become more apparent from the detailed description, set forth below, when taken in conjunction with the drawings, in which like reference characters identify elements correspondingly throughout.

DETAILED DESCRIPTION OF THE PREFERRED EMBODIMENTS

Figure 1:
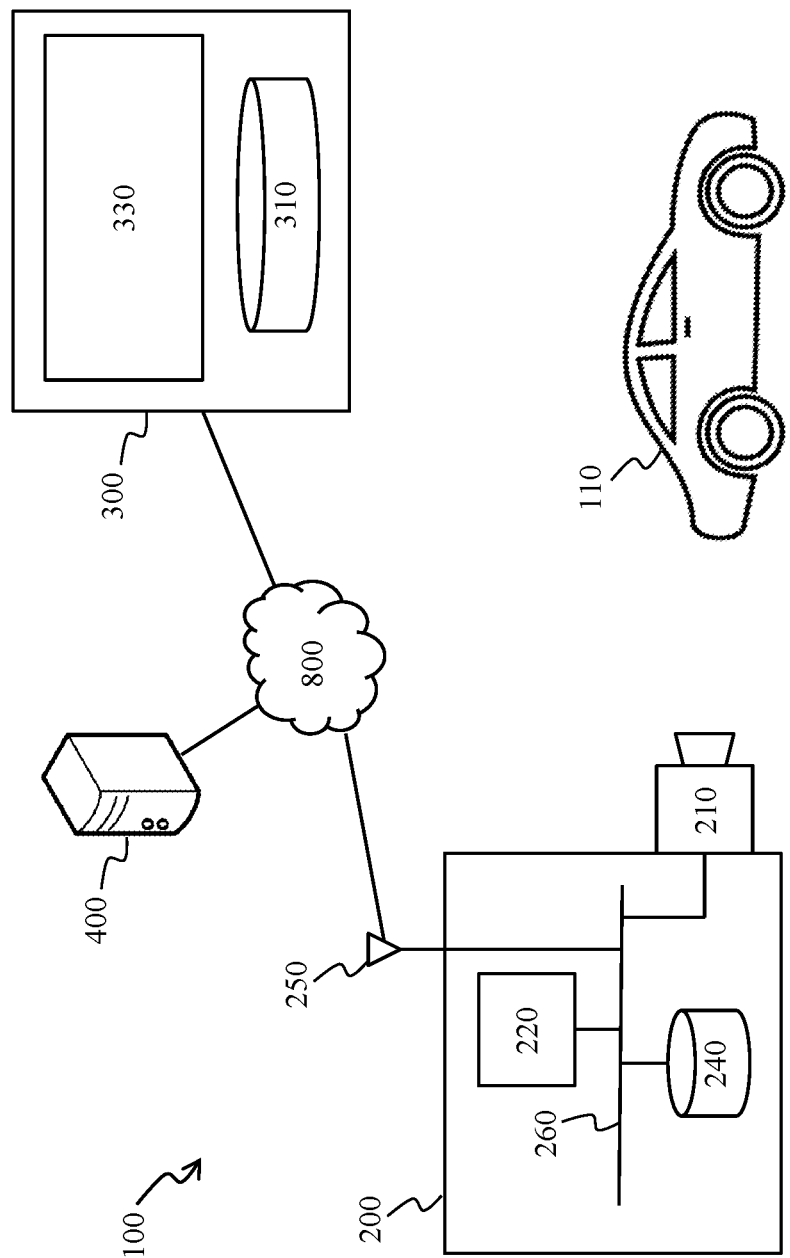
FIG. 1 illustrates an exemplary traffic monitoring system in accordance with at least one embodiment of the invention.

The above described drawing figures illustrate the present invention in at least one embodiment, which is further defined in detail in the following description. Those having ordinary skill in the art may be able to make alterations and modifications to what is described herein without departing from its spirit and scope. While the present invention is susceptible of embodiment in many different forms, there is shown in the drawings and will herein be described in detail at least one preferred embodiment of the invention with the understanding that the present disclosure is to be considered as an exemplification of the principles of the present invention, and is not intended to limit the broad aspects of the present invention to any embodiment illustrated.

In accordance with the practices of persons skilled in the art, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, code segments perform certain tasks described herein. The code segments can be stored in a processor readable medium. Examples of the processor readable mediums include an electronic circuit, a semiconductor memory device, a read-only memory (ROM), a flash memory or other non-volatile memory, a floppy diskette, a CD-ROM, an optical disk, a hard disk, etc.

In the following detailed description and corresponding figures, numerous specific details are set forth in order to provide a thorough understanding of the present invention. However, it should be appreciated that the invention may be practiced without such specific details. Additionally, well-known methods, procedures, components, and circuits have not been described in detail.

The present invention generally relates to traffic monitoring systems and methods, and more particularly to such systems and methods for reducing the operational load on the communications infrastructure of the system.

FIG. 1 is a schematic representation of a traffic monitoring system 100 in accordance with one or more aspects of the invention. As shown in FIG. 1, the traffic monitoring system 100 comprises one or more traffic sensors 200 communicatively coupled to a system server 300, via a network 800. In general, the traffic monitoring system 100 enables the collection of traffic related data for transmission to a law-enforcement server 400, via the network 800.

Each traffic sensor 200 comprises an imaging device 210, an image processing unit 220, a memory 240, and a transceiver 250, each communicatively coupled to a common data bus 260 that enables data communication between the respective components. It will be understood that one or more components of the traffic sensors 200, or functions thereof, may be distributed through the traffic monitoring system 100.

The imaging device 210 captures images of traffic, in particular, video images of vehicles 110 making up the traffic, and generates video data therefrom. The imaging device 210 may be a video camera of any camera type, which captures video images suitable for computerized image recognition of objects within the captured images. For example, the camera may utilize charge-coupled-device (CCD), complementary metal-oxide-semiconductor (CMOS) and/or other imaging technology, to capture standard, night-vision, infrared, and/or other types of images, having predetermined resolution, contrast, color depth, and/or other image characteristics. The video data may be timestamped so as to indicate the date and time of recording.

The image processing unit 220 applies computerized image recognition techniques to the video data captured by the imaging device 210 so as to identify objects within the video images. In particular, the image processing unit 220 identifies individual vehicles captured by the video images, as well as their associated characteristics. These vehicle characteristics may include, for example, vehicle type, class, make, model, color, year, drive type (e.g., electric, hybrid, etc.), license plate number, registration, trajectory, speed, location, etc., or any combination thereof.

The image processing unit 220 also generates a recognition record for each recognized vehicle from the recognized vehicle characteristics. The recognition record is preferably a dataset of image recognized values for one or more of the vehicle characteristics, i.e., characteristic data. For example, the characteristic data for the license plate number characteristic is the image recognized license plate number for the recognized vehicle. In at least one embodiment, the recognition record is at least the license plate number. However, the recognition record can include any subset of the characteristic data, and may also include additional data, such as the timestamp of the associated video data from which the recognition record is generated, and one or more captured images of the vehicle and/or the license plate. The recognition record is preferably in the form of a data object whose value is the license plate number, and whose metadata reflects the remainder of the characteristic values, if any.

The image processing unit 220 may be embodied, collectively or individually, as one or more processors programmed to carry out the functions of the unit in accordance software stored in the memory 240. Each processor may be a standard processor, such as a central processing unit (CPU), graphics processing unit (GPU), or a dedicated processor, such as an application-specific integrated circuit (ASIC) or field programmable gate array (FPGA), or portion thereof.

The memory 240 stores software and data that can be accessed by the processor(s), and includes both transient and persistent storage. The transient storage is configured to temporarily store data being processed or otherwise acted on by other components, and may include a data cache, RAM or other transient storage types. The persistent storage is configured to store software and data until deleted.

In at least some embodiments, the memory 240 is configured to store the data and information described herein. In particular, the memory 240 stores the recognition records, and the associated image and video data until deleted.

The transceiver 250 communicatively couples the traffic sensor 200 to the network 800 so as to enable data transmission therewith. The network 800 may be any type of network, wired or wireless, configured to facilitate the communication and transmission of data, instructions, etc., and may include a local area network (LAN) (e.g., Ethernet or other IEEE 802.03 LAN technologies), Wi-Fi (e.g., IEEE 802.11 standards), wide area network (WAN), virtual private network (VPN), global area network (GAN)), a cellular network, or any other type of network or combination thereof.

In general, each server many include one or more server computers connected to the network 800. Each server computer may include computer components, including one or more processors, memories, displays and interfaces, and may also include software instructions and data for executing the functions of the server described herein. The servers may also include one or more storage devices configured to store large quantities of data and/or information, and may further include one or more databases. For example, the storage device may be a collection of storage components, or a mixed collection of storage components, such as ROM, RAM, hard-drives, solid-state drives, removable drives, network storage, virtual memory, cache, registers, etc., configured so that the server computers may access it. The storage components may also support one or more databases for the storage of data therein.

The system server 300 includes one or more record databases 310 configured to store data received from the traffic sensors, and one or more hot list databases 320 each of which defines a hot list of vehicles-of-interest. Each hot list identifies respective vehicles-of-interest by one or more vehicle characteristics, preferably at least by their respective license plate numbers. In some embodiments, vehicles-of-interest may also be identified via one or more images, such as images of the vehicle or license plate. Hot lists may be provided to the system server 300 by law-enforcement, via transmission over the network from the law-enforcement server 400, and may be updated periodically or on an ad hoc basis.

The system server 300 is generally configured to provide centralized support for the traffic sensors 200. The system server 300 is configured to receive the recognition records from each of the traffic sensors 200, and to store the received recognition records in the record database 310. Each recognition record is stored in the database for an associated retention period, after which the recognition record is deleted.

The system server 300 also includes a comparison unit 330 configured to compare the recognition reports to the one or more hot lists. One or more data and/or image comparison techniques may be used by the comparison unit 330 to make the comparison. In at least one embodiment, the comparison unit 330 compares the license plate number provided by the recognition record to the license plate numbers identified in the hot list. Where the comparison unit 330 determines that the recognition record matches a listed vehicle-of-interest (i.e., a "hit"), the comparison unit 330 returns a hit notification, which identifies the hit and the associated recognition record.

The comparison unit 330 may be embodied as one or more processors programmed to carry out the functions of the unit in accordance software stored in the memory. Each processor may be a standard processor, such as a central processing unit (CPU), or a dedicated processor, such as an application-specific integrated circuit (ASIC) or field programmable gate array (FPGA), or portion thereof.

In operation, the recognition record is transmitted to the system server 300, where the comparison unit 330 compares the recognition record to the one or more hot lists to determine any hits. The system server 300 then stores the recognition record based on the results of the comparison and according to set retention periods. It will be understood that the comparison unit 330 may also be embodied as part of one or more traffic sensors, such that the comparison occurs at the traffic sensor level, the result of which is sent to the system server 300.

The retention periods include hit retention periods, which are associated with respective hot lists, and a default retention period. The hit retention periods for each hot list may differ (reflecting the privacy desires) and are stored in the database 310 in association with the respective hot list. The default retention period is also stored in the database 310. In the event of a hit on a hot list, the system server 300 refers to the hit retention period associated with the hot list, and stores the recognition record in the database for the duration of the hit retention period. In the event of no hit the system server 300 refers to the default retention period and stores the recognition record in the database for the duration of the default retention period.

The retention periods may be of any duration, including no duration. Where a retention period is of no duration, then recognition record is not saved, or is otherwise deleted immediately. The hit retention periods may be greater than, equal to, or less than the default retention period. In at least one embodiment, the rejection periods may be dynamically set according to external factors, such as, for example, the time of day, geographic location (e.g., school zones, etc.), etc. It should also be noted that what constitutes a "hit" on a hot list may also vary based on these and other external factors.

The system server 300 is further configured to set and adjust the retention periods, in particular by way of user operation of the server computer via a graphical user interface. Accordingly, the retention periods may be set and/or adjusted in response to privacy or other concerns. In particular, the retention periods may vary depending the severity of the hot list. For example, the hit retention periods may be set differently for hot lists directed to felonies, terrorists, etc. than for hot lists directed misdemeanors, scofflaws, etc. The hit retention periods may also vary for hot lists from different agencies or entities, or based on the communities in which the traffic sensors are located. For example, the hit retention period for immigration agency based hot lists may be set differently for traffic sensors located within one municipality or other community versus another. Thus, the retention periods may be set and/or adjusted to reflect dynamic community and/or agency policies.

In at least one embodiment, the system server 300 is configured to dynamically determine the retention periods based on detected or otherwise identified circumstances. For example, the retention periods may be dynamically set according to external factors, such as, for example, the time of day, geographic location (e.g., school zones, etc.), etc. It should also be noted that what constitutes a "hit" on a hot list may also vary based on these and other external factors. The retention periods may also be set according to secondary factors, such as the severity and/or type of hit. For example, different retention periods may be set for a misdemeanor hit than a felony hit on the same hot list. It will be understood that the retention periods may be adjusted for any perturbation of factors.

The law-enforcement server 400 is a server of a law-enforcement agency, e.g., police, highway patrol, sheriff, or other local, state or federal law-enforcement agency, which is configured to send data to and receive data from the system server 300. In particular, the law-enforcement server 400 may add, delete or modify hot lists stored on the system server 300, in accordance with various permissions, as is known in the art. The law-enforcement server 400 may also pull, request or otherwise receive recognition records stored in the system server 300 in accordance with the adjustable retention periods.

Figure 2:
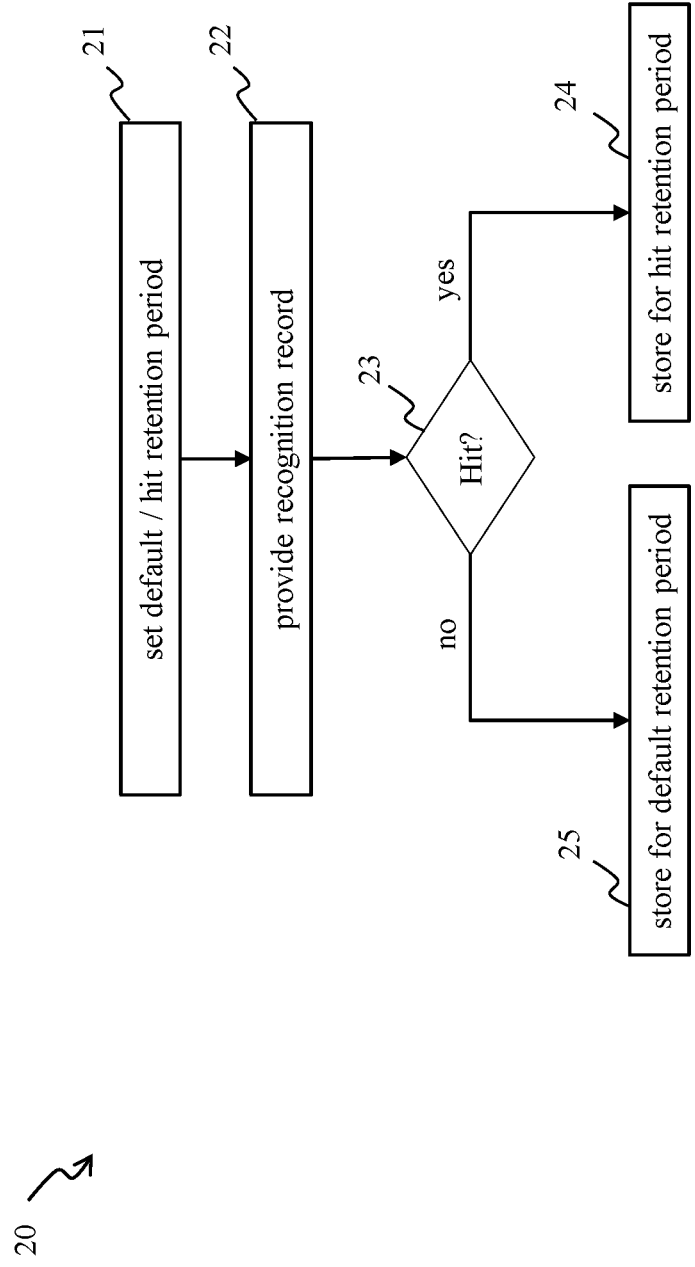
FIG. 2 illustrates an exemplary method for traffic monitoring in accordance with at least one embodiment of the invention.

FIG. 2 is a flow-chart representing an exemplary method 20 of operation for the traffic monitoring system in accordance with one or more aspects of the invention.

At step 21, the default retention period and/or hit retention periods for one or more hot lists are set and/or adjusted from initial values. The hit retention periods for each hot list are stored in the database in association with the respective hot list. The default retention period is also stored in the database. The retention periods may be set and/or adjusted to any duration, including no duration. In at least one embodiment, the default retention period may be set to immediately delete the recognition record such that non-hit retention records are immediately deleted. In at least one embodiment, setting the hit retention period includes setting the hit retention period to by dynamically determined by the system, as discussed herein.

At step 22, the recognition record is generated and transmitted to the system server 300. In at least one embodiment, the recognition record is at least the license plate number. However, the recognition record can include any subset of the characteristic data, and may also include additional data. The recognition record is preferably in the form of a data object whose value is the license plate number, and whose metadata reflects the remainder of the characteristic values, if any.

At step 23, the recognition record is compared to one or more hot lists to identify hits. In at least one embodiment, the comparison unit 330 compares the license plate number provided by the recognition record to the license plate numbers identified in the hot list. Where the comparison unit 330 determines that the recognition record matches a listed vehicle-of-interest, the comparison unit 330 returns a hit notification, which identifies the hit and the associated recognition record.

At step 24, if the comparison identifies a hit on a hot list, the system server 300 refers to the hit retention period associated with the hot list, and stores the recognition record in the database for the duration of the hit retention period.

At step 25, if the comparison results in no hits, the system server 300 refers to the default retention period and stores the recognition record in the database for the duration of the default retention period.

As the retention periods are adjustable, the storage durations of the retention records and related data can be modified by a user in response to changing policies of interested communities, e.g., law-enforcement, municipalities, etc. Moreover, as each retention period is separately adjustable, a more nuanced overall retention scheme can be had, further tailoring the traffic monitoring system to reflect partner community policies, particularly with respect to personal privacy.

The embodiments described in detail above are considered novel over the prior art and are considered critical to the operation of at least one aspect of the described systems, methods and/or apparatuses, and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus, if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense, it is therefore contemplated that an equivalent substitution of two or more elements may be made for any one of the elements described and its various embodiments or that a single element may be substituted for two or more elements.

Changes from the subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

Furthermore, the functionalities described herein may be implemented via hardware, software, firmware or any combination thereof, unless expressly indicated otherwise. If implemented in software, the functionalities may be stored in a memory as one or more instructions on a computer readable medium, including any available media accessible by a computer that can be used to store desired program code in the form of instructions, data structures or the like. Thus, certain aspects may comprise a computer program product for performing the operations presented herein, such computer program product comprising a computer readable medium having instructions stored thereon, the instructions being executable by one or more processors to perform the operations described herein. It will be appreciated that software or instructions may also be transmitted over a transmission medium as is known in the art. Further, modules and/or other appropriate means for performing the operations described herein may be utilized in implementing the functionalities described herein.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A traffic monitoring system, comprising:
    a roadside traffic sensor unit, including:
        an imaging device configured to capture images of vehicles within a field-of-view of the imaging device,
        an image processing unit configured to process the captured images of a vehicle so as to generate a recognition record that is a data object whose value is an image recognized license plate value and whose metadata constitutes image recognized values for one or more other characteristics of the vehicle, and
        a transceiver configured to transmit the recognition record;
    an off-site device remote from the traffic sensor unit, the off-site device including:
        a transceiver configured to receive the recognition record transmitted by the traffic sensor unit and a hot list identifying one or more vehicles-of-interest,
        a memory configured to store the received recognition record for up to a retention period, and
        a processor configured to set the retention period based on a comparison of the recognition record to the hot list identified vehicles-of-interest.

2. The traffic monitoring system of claim 1, wherein the recognition record includes a license plate number of the vehicle.

3. The traffic monitoring system of claim 1, wherein the recognition record comprises a set of vehicle characteristics, including one or more of: type, class, make, model, color, year, drive type, license plate number, registration, trajectory, speed, and location of the vehicle.

4. The traffic monitoring system of claim 1,
    wherein the processor is further configured to determine a hit status of the recognition record based on the comparison to the hot list, and
    wherein the retention period is set according to the hit status.

5. The traffic monitoring system of claim 4,
    wherein the retention period is set to a default retention period in response to the hit status indicating that the vehicle is not one of the vehicles-of-interest, and
    wherein the retention period is set to a first retention period, greater than the default retention period, in response to the hit status indicating that the vehicle is one of the vehicles-of-interest.

6. The traffic monitoring system of claim 5,
    wherein the retention period is set to the first retention period in response to the hit status further indicating a first severity level, and
    wherein the retention period is set to a second retention period, greater than the first retention period, in response to the hit status further indicating a second severity level.

7. The traffic monitoring system of claim 6, wherein the processor uses severity level data of the hit list to set the first retention period according to the first severity level and to set the second retention period according to the second severity level.

8. The traffic monitoring system of claim 1, wherein the retention period is zero.

9. The traffic monitoring system of claim 1, wherein the retention period is dynamically set based on one or more environmental conditions.

10. The traffic monitoring system of claim 1, wherein the off-site device further comprises:
a graphical user interface configured to enable a user to manually set the retention period.

11. A method for monitoring traffic, comprising:
receiving, by an off-site device from a roadside sensor unit, a recognition record generated by the roadside sensor unit from captured images of a vehicle within a field-of-view of an imaging device of the roadside sensor unit, wherein the retention record is a data object whose value is an image recognized license plate value and whose metadata constitutes image recognized values for one or more other characteristics of the vehicle;
receiving, by the off-site device, a hot list identifying one or more vehicles-of-interest;
setting a retention period based on a comparison of the retention record to the hot list identified vehicles-of-interest; and
storing the recognition record in a memory of the off-site device for up to the retention period.

12. The traffic monitoring method of claim 11, wherein the recognition record includes a license plate number of the vehicle.

13. The traffic monitoring method of claim 11, wherein the recognition record comprises a set of vehicle characteristics, including one or more of: type, class, make, model, color, year, drive type, license plate number, registration, trajectory, speed, and location of the vehicle.

14. The traffic monitoring method of claim 11, further comprising:
determining a hit status of the recognition record based on the comparison to the hot list, wherein the retention period is set according to the hit status.

15. The traffic monitoring method of claim 14, wherein setting the retention period further comprises:
setting the retention period to a default retention period in response to the hit status indicating that the vehicle is not one of the vehicles-of-interest, and
setting the retention period to a first retention period, greater than the default retention period, in response to the hit status indicating that the vehicle is one of the vehicles-of-interest.

16. The traffic monitoring method of claim 15, wherein setting the retention period further comprises:
setting the retention period to the first retention period in response to the hit status further indicating a first severity level, and
setting the retention period to a second retention period, greater than the first retention period, in response to the hit status further indicating a second severity level.

17. The traffic monitoring method of claim 16, wherein severity level data of the hit list is used to set the first retention period according to the first severity level and to set the second retention period according to the second severity level.

18. The traffic monitoring method of claim 11, wherein the retention period is zero.

19. The traffic monitoring method of claim 11, wherein the retention period is dynamically set based on one or more environmental conditions.

20. The traffic monitoring method of claim 11, further comprising:
manually setting the retention period by a user using a graphical user interface of the off-site device.

* * * * *